AMPLIFIER REDUNDANCY CIRCUITS

Filed June 12, 1962 2 Sheets-Sheet 1

INVENTOR.
FRANK SCHWARZ
WAYNE W. CHOU
BY
Robert Ames Norton
ATTORNEY

INVENTORS
FRANK SCHWARZ
WAYNE W. CHOU

BY

Robert Ames Norton
ATTORNEY

United States Patent Office 3,237,120

Patented Feb. 22, 1966

3,237,120

AMPLIFIER REDUNDANCY CIRCUITS

Frank Schwarz and Wayne W. Chou, Stamford, Conn., assignors to Barnes Engineering Company, Stamford, Conn., a corporation of Delaware Filed June 12, 1962, Ser. No. 201,838
5 Claims. (Cl. 330—51)

This invention relates to improved switching circuits, particularly for low level sources, and amplifiers to provide the effect of amplifier redundancy without increasing the number of amplifiers.

Many problems are involved in switching sequentially a number of amplifiers to a much larger number of signal sources when long unattended operation is necessary and maximum reliability is of importance. This problem is at its most acute in sequential switching of a large number of radiation detectors with a small number of amplifiers for use in satellites or other space vehicles or for operations where the circuits must operate without attendance for a period of time greater than the average reliable life of an amplifier. The invention will be described in connection with this most important single field of utility but it should be understood that the invention is a switching invention and that it may be applied to signal sources of any kind. The invention is, therefore, not limited to sampling of radiation detectors.

It is becoming more and more necessary to provide a large number of radiation detectors, which may be numbered in the hundreds, where these detectors have to be used for long periods of time without attention. For example, if a large mosaic of detectors is continuously exposed to radiation for periods of time long in comparison with the detector time constant greater sensitivity is obtained than if the single detector or a small number of detectors have to be rapidly scanned. The detectors may be all the same and simply represent different positions in an area being observed or they may be in groups some having one response, for example to shorter wave radiation and others having response to other wavelength bands. The problem presented is still the same. The radiation detectors are essentially low level sources producing signals in the microwatt and fractional microwatt ranges. These signals have to be extensively amplified and in order to keep down costs and, what is more important in space work weight and power consumption, a relatively small number of amplifiers have to be switched sequentially from one detector to another. The final outputs of the sampling amplifiers are then switched to operational amplifiers and the results may be stored, for example on magnetic tape or telemetered either immediately or on command from storage.

If a particular amplifier which samples a restricted number of detectors breaks down there is a gap in the information obtained. For example, if the array of detectors were supposed to cover a given field of view a nonfunctioning amplifier would leave blank spots corresponding to the detectors which it serves. If the number of amplifiers is small or more than one amplifier breaks down this can soon result in information which is sadly lacking in overall precision and an instrument may lose much of its usefulness even though the majority of its components are still functioning. The importance and degree of the advantage of the present invention increases greatly with the number of sources. However, representation of the switching circuit becomes difficult to describe because of complexity. Therefore, the present invention will be specifically described in connection with only sixteen sources which are sampled by four amplifiers. The invention operates in exactly the same manner with a much larger number of sources and/or amplifiers and, of course, presents much greater advantages in such case.

Let us assume that the sixteen detectors either form a very coarse raster viewing a particular area or that they represent sixteen different radiation wavelength bands. The four amplifiers may easily be switched by using amplifier A for sources 1, 5, 9 and 13, B for sources 2, 6, 10 and 14 and C for sources 3, 7, 11 and 15 and D for sources 4, 8, 12 and 16. The sampling rate, that is to say the repetition through which the four amplifiers successively sample the sixteen sources may be quite high, for example, 5 to 10 kc. This sampling rate can be, and usually is, considerably higher than the persistence of the readout mechanisms whether they be cathode ray tubes to which the data is telemetered or other readouts which have relatively high persistence so that the repeated signals from a particular source appear at a certain point on a certain readout instrument.

Let us assume now that amplifier C ceases to function. This means that there will be no information from sources 3, 7, 11 and 15. If the array represents a raster this whole line will be blank. If the sources are different wavelength bands information on these four bands will be completely lost. If two amplifiers break down half of the information becomes lost. If three amplifiers break down three quarters of the information becomes lost. It is with a solution of the problem presented that the present invention deals.

Essentially the invention provides for a staggering of amplifier connections, for example in the first sampling amplifier A samples sources 1, 5, 9 and 13. In the next sampling sequence amplifier B samples these, then amplifier C and then amplifier D. As a result if an amplifier breaks down it means only that information does not come through one quarter of the time but it is randomly distributed among all of the sixteen sources. If readouts with persistence of two to four times sampling sequence interval length are used it cannot be noticed that an amplifier has broken down. The average level of energy will be somewhat decreased but it will come from all of the sources and there will be no lost information. Even if two amplifiers break down the information still gets through and theoretically it would get through if only a single amplifier remained operative. This would be practically achievable with four amplifiers and only sixteen sources but with much larger numbers of sources and amplifiers it is sometimes difficult to go to the limit because the decrease in average signal level may become too great. However, reliability is enormously increased, for example if two amplifiers can break down without adversely affecting the transmittal of information the average life is a product of the average lives of two single amplifiers. With reliable components this can mean that amplifier breakdown may often be completely disregarded even in installations which must run for months or years unattended. It will be pointed out in the more specific description which will follow that the great advantage of the present invention is obtained with the addition of a relatively small number of cheap and very reliable components, completley negligible in number of components and cost, as compared to the amplifiers and other constituents of the instrument. Additional power consumption while not zero is only a very small fraction of that required for switching amplifiers with no provision for the greately extended reliable life which is made possible by the present invention.

The invention will be illustrated in connection with the drawings in which.

Figure 1:
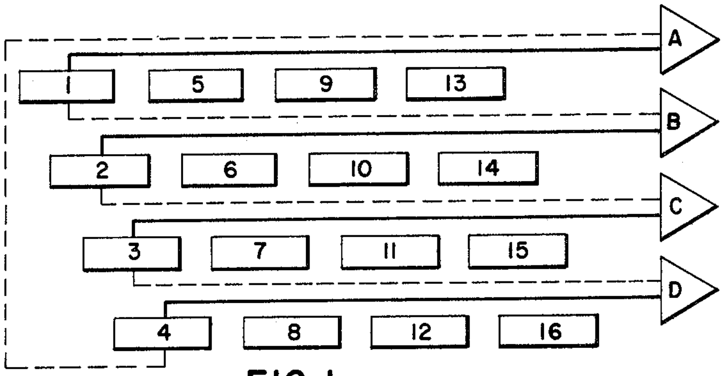
FIG. 1 is a diagram of sixteen sources and four amplifiers showing connections for one set of four contacts and the first two stagger positions.

FIG. 1 shows sixteen numbered sources and four preamplifiers A, B, C and D. The solid lines show the connections of the inputs of the four preamplifiers for the first quarter of the switching cycle. Solid lines show the connection of A to 1, B to 2, C to 3, and D to 4. In the second quarter of the swtiching cycle the inputs would be connected to 5, 6, 7 and 8, in the third to 9, 10, 11 and 12 and in the fourth to 13, 14, 15 and 16 respectively. After one complete sampling cycle the amplifier inputs are staggered. This is shown for the first four sources by dashed lines connecting the amplifier inputs. It will be seen that now B is connected to 1, C to 2, D to 3 and A to 4. After another sequence C would be connected to 1, D to 2, A to 3 and B to 4 and so on. It will be noted that if one amplifier, let us suppose amplifier C, breaks down, on the first sampling cycle there will be no signal from sources 3, 7, 11 and 15. But on the next sampling these sources will be served by amplifier D, then by amplifier A and finally by amplifier B. In other words, these three sources will fail to have their signal amplified only one time out of four and the same is true of the other sources. If the final signals are carried to a readout of the cathode ray type it is only necessary that the persistence of the phosphor be for more than one sampling cycle, then the information will appear exactly the same on the readout device though the total energy from any one source will be decreased by 25%. However, the information from all of the sources will be faithfully reproduced.

Figure 2:
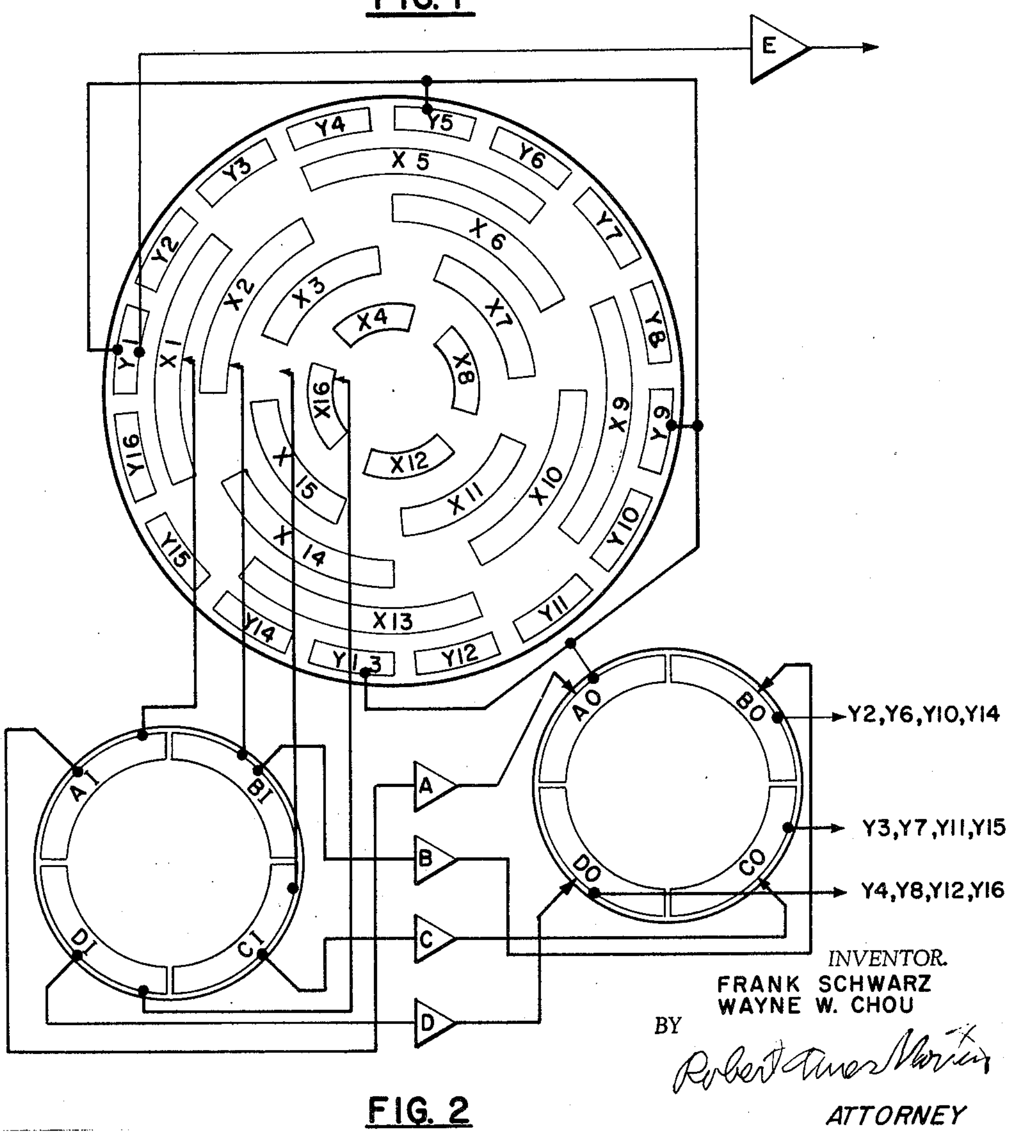
FIG. 2 is a semidiagrammatic representation of mechanical switching means.

FIG. 2 shows a mechanical switching setup. It is rare for a mechanical switching setup to exhibit sufficient speed for practical use though such switching is included in the invention wherever the conditions permit. However, the explanation of the switching sequence is simpler with mechanical switching devices and so such a setup will first be described. On a mechanical switching disc there are two sets of switch contacts. The first set is formed of sixteen narrow contacts about the periphery. This switching set will be referred to as the Y bank and each of its contacts will carry the number with the letter prefix. A second series of contacts each approximately three times the length of the Y contacts are arranged staggered in four concentric rings on the switch disc. This bank of switch contacts is referred to as the X bank and when a particular numbered contact is referred to in the description it will be given the corresponding letter prefix.

The input of an operational amplifier E contacts successively the contacts Y1 to Y16 as the disc rotates. The figure shows the disc in the position with the input of the operational amplifier connected to contact Y1.

Two other switching discs are shown in the figure and are rotated synchronously with the first disc but at one quarter the speed. Since the gearing to bring about the rotation is conventional and the drawing is diagrammatic the gear drive is not shown.

The first slow speed disc which effects input switching is provided with four contacts nearly filling the whole circle. These contacts are designated AI, BI, CI and DI. As the disc slowly turns the inputs of the amplifiers A, B, C and D successively contact the contacts AI to DI, the drawing showing the position in which amplifier A is connected to AI, B to BI, C to CI and D to DI. As the disc is rotating at one quarter speed this contact will be retained during a whole rotation of the first disc, in other words through sixteen of the Y contacts. The contacts AI to DI are permanently connected through conventional slip rings (not shown), to the four staggered rings of contacts of the X bank on the first disc. In the drawing contact AI is connected to contacts X1, BI to X2, CI to the space between X15 and X3 and DI to X16. As the first disc rotates the input of amplifier A remains connected to source (1) through contact AI and X1. This contact remains for just under a quarter of a revolution of the first disc. Then contact X5 which is connected permanently to source (5) becomes connected to AI and hence to the input of amplifier A.

After another quarter of revolution source (9) is connected through contact X9 and AI to amplifier A and finally in the last quarter of a revolution source (13) is connected to amplifier A through contacts X13 and AI. During this same revolution the input to amplifier B will be connected to sources 2, 6, 10 and 14 through contact BI and contacts X2, X6, X10 and X14 on the fast turning switch disc. In the same manner amplifiers C and D will be successively connected to sources 3, 7, 11 and 15 and 4, 8, 12 and 16 respectively.

The outputs of the preamplifiers A, B, C and D are connected to four contacts on a second slow turning disc these contacts being labelled AO, BO, CO and DO. Again as with the inputs of the amplifiers the contact lasts for substantially a whole revolution of the fast disc except for the very short insulation break between contacts which is much less than the width of one of the Y bank contacts. In a manner similar to the input disc I the output disc O has its contacts permanently connected to contacts on the Y bank. Contact AO is connected to contacts Y1, Y5, Y9 and Y13, BO to Y2, Y6, Y10 and Y14, CO to Y3, Y7, Y11 and Y15 and DO to Y4, Y8, Y12 and Y16. In order to eliminate a large multiplicity of wiring on the drawings only the connection of contact AO to contacts Y1, Y5, Y9 and Y13 is shown. The connections of the other four contacts BO, CO and DO occur in the same manner.

Before describing the sampling cycles it should be mentioned that the fast disc on FIG. 2 is shown as embodying another invention which is described and claimed in the copending application of Chou, Serial No. 199,290, filed June 1, 1962, and which provides for noise free switching of the inputs of preamplifiers to signal sources. This is effected by having the contacts of the X bank approximately three times the width of a contact on the Y bank and staggered counter clockwise by the width of one Y bank contact. This results in connecting the input of amplifier A to source (1) at a time when the input of amplifier E is connected to contact Y16. The noise transient which always accompanies the activation of a switch soon dies down and by the time the fast disc has made a sixteenth of a revolution the connection from the input of the amplifier A to source (1) is substantially noise free. This connection is through contact AI, the switching noise of which has also died down, and contact X1. Now the input of amplifier E connects to the output of amplifier A through contact Y1 and contact AO on the second slow turning disc. The switching in of the input of amplifier E to contact Y1 is not noise free but as preamplifier A has amplified the signal noise to a level above switch noise level, this noise does not interfere.

The present invention has nothing to do directly with the invention of the Chou application and would apply equally if contacts of the X bank were opposite and of the same width as contact Y1. The advantages of continued information even when an amplifier breaks down would remain as before. However, since one of the important fields for the present invention is in radiation detectors which put out a low level signal the drawings illustrate the best connections though the invention is in no sense limited to their use.

FIGS. 1 and 2 illustrate mechanical switching where the rate of sampling is sufficiently slow to permit this form of switching. It is cheap, reliable and as can be seen the protection against amplifier breakdown is obtained with the addition of a simple pair of gears and two more switch discs running at a lower speed. However, for many purposes sampling rates are required which are far above the capabilities of mechanical switching and for these purposes a faster means must be used. In general this means electronic switching and will be described first in conjunction with FIG. 3.

In this figure the sixteen sources bear the same reference numerals as in FIGS. 1 and 2. There are the same four switching banks X, Y, I and O and as in FIGS. 1 and 2 the switching rate for each switch in the I and O banks is only one-sixteenth that in the X and Y banks. The amplifiers also bear the same reference letters and the switches in the banks are numbered with their letter prefixes precisely as in FIGS. 1 and 2. As in FIGS. 1 and 2 the silent input switching in bank X is described though, of course, as pointed out above, the present invention is in no sense limited to the use of this improved type of switching.

Switches X1 to X16 are shown as rectangles, their dimensions corresponding to the relative period during which each switch is connected. In other words, the X switches are about three times as long in duration as the Y switches. The present invention is in no sense concerned with the particular design of electronic switches and any conventional type such as diodes, transistors and the like may be used. As referred to above the invention is described in connection with infrared detectors. Only the connections for source (1) are shown to avoid confusion. The solid lines show the connection in the first cycle and dashed lines show the connection of the switches in the I and O banks in the second cycle. The connections are in general similar to the arrangement in FIG. 1.

Electronic switches require a source of switching command pulses and in this respect the present invention does not differ in any way from standard practice. Accordingly, there is indicated a pulse generator 20 which generates switching pulses at the switching frequency for the Y bank. These pulses are then distributed sequentially to the various contacts of the Y bank by a suitable device 21 which may be a ring counter. The invention is in no sense limited to the use of ring counters and other well known electronic devices may be used such as beam switching tubes. When there is a very large number of switches to be operated sequentially there is an advantage in using beam tubes. For example, two beam tubes may handle one hundred switch points, three a thousand and the like. Other methods for producing pulse switching commands in sequence may also be employed and ring counters and beam switching tubes are merely mentioned as two typical illustrations. In order to keep the drawing from an unnecessary confusion of a large number of connections only three of the output connections from the ring counter are shown instead of sixteen and they are designated by arrows going to their particular switches, in this case Y1, Y2 and Y3. In actual operation there are, of course, sixteen outputs. The ring counter actuates the Y banks switches in sequence and the duration is determined by the time constants of the counter and switching circuits. It is, of course, sufficiently short so that no overlapping takes place. The interval during which each Y switch is closed will be referred to below as the Y switch interval.

The outputs from the ring counter also pass to a pulse stretching circuit 22 of conventional design. The time constants of this circuit serve to stretch the pulse width approximately three times so that a switch interval for the X bank is approximately three Y switch intervals. From the pulse stretcher, command pulses go to switches X1, X5, X9 and X13 and these switches are actuated in sequence. This is shown by arrows with the appropriate switches specified. From the pulse stretcher 22 the signals are led to a delay line 23 which is also of conventional design and so is shown in block diagram form. This delay line has a time constant so that it effects a delay equal to one Y switch interval. Outputs are led to switches X2, X6, X10 and X14 as is shown by the arrow. In other words, these switches are actuated one Y switch interval later than switches X1, X5, X9 and X13. In a similar manner two more delay lines 24 and 25 are used to actuate switches X3, X7, X11 and X15 and X4, X8, X12 and X16 respectively. This is also indicated by arrows on the drawings.

There are four cycles of X bank switch operation during the interval of sixteen switch actuations and the particular X bank switches are actuated in their proper sequence. It will be seen that this produces exactly the same switching effect as is shown in FIG. 1 but because of electrical actuation much higher switching rates, such as for example 10 kc., are possible which would be beyond the capabilities of mechanical switching. It should be noted that in order to effect the noise free switch connections in the X bank the X contacts have to be switched one Y switch interval earlier, for example in FIG. 1, the switch contact X1 is first connected in the position corresponding to Y16 and not to Y1 and in a similar manner the other switch contacts of the X bank are staggered by one Y switch interval. The same thing is done electrically in FIG. 3. The command pulses from the stretcher 22 which actuate switch X1 are initiated by the Y16 pulse and so on. The operation, of course, is the same as the circuits are not concerned with how their switches were actuated.

The outputs from the ring counter 21 are also led to a frequency dividing circuit 26 of conventional design which divides the frequency down to one-sixteenth. These pulses which recur at a rate one-sixteenth of the ring counter frequency are then stretched in a pulse stretcher 27. These signals actuate four switches AI, BI, CI and DI in the I bank and four switches AO, BO, CO and DO in the O bank. For convenience the arrows from the pulse stretcher 27 are simply labelled A, B, C and D as they command the corresponding switches in each of the I and O banks. Because of the excessive size that these switches would have to have on the drawing to represent their interval duration in proportion to the length of the interval they are simply shown as boxes of intermediate size between the Y switches and the X switches. It should be understood that each of the gating pulses A, B, C and D actuate the corresponding switches in the I and O banks for a period of time corresponding to one complete cycle of the X and Y banks. The effect, of course, is exactly the same as that of the corresponding mechanical contact in FIG. 3, and again there is no difference in the functions performed. That is to say in the first cycle, preamplifier A will have its input connected to switches X1, X5, X9 and X13 and its output connected to switches Y1, Y5, Y9 and Y13. Similarly the preamplifiers B, C and D are connected as in the case of FIG. 2.

At the beginning of the second switching cycle the pulse switches amplifier A to the connections which formerly led to preamplifier D, B goes to A and C goes to B again precisely as in FIG. 2. After four cycles the situation is restored to the condition shown in the drawing. It should be noted that the switches in the I and O banks each have four inputs which are switched to the respective preamplifier inputs and outputs, each switching taking place only once in a whole cycle under the command of the stretched quarter frequency command pulses from the stretcher 27. Looking at it another way the switches in the I and O banks might be considered as counters operating at one-sixteenth Y bank switching frequency. Expressing the operation mathematically, if the number of sources is $x$ and the switching frequency of each switch in the X bank and in the Y bank is $f$, the switching frequency in the banks I, O and E is $f/nx$, where $n$ is a positive integer, in the illustrations in the drawings and usually $n$ is one.

Figure 4:
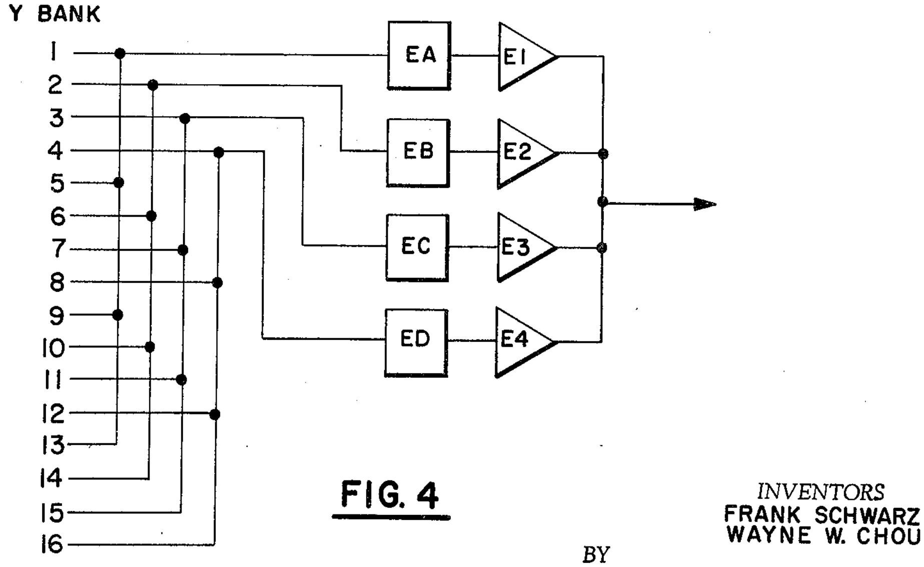
FIG. 4 is a diagrammatic illustration of a modified switching means.

It will be noted that in the drawings only a single amplifier E has been illustrated and, of course, it too may break down. Here again the amplifiers may be multiplied either by connecting in parallel several amplifiers in such a manner that when one amplifier breaks down the others will carry the load, and an even more elegant manner is to provide four amplifiers each handling a quarter of the Y switch outputs connected by a third quarter frequency operated switch bank in the same manner as the input bank of switches AI, BI, CI and DI are operated. This is illustrated in FIG. 4. For clarity only the Y bank switch outputs are shown. The output connections of the Y bank switches are shown divided into groups exactly as the output connections of the X switches. The four operational amplifiers are designated E1, E2, E3 and E4 and there are four switches EA, EB, EC and ED. These four switches which have four parallel inputs are switched by the command pulses from the stretcher 27. In FIG. 4 they are shown connecting amplifier E1 to contacts Y1, Y5, Y9 and Y13. Amplifier E2 contacts Y2, Y6, Y10 and Y14, amplifier E3 contacts Y3, Y7, Y11 and Y15 and amplifier E4 contacts Y4, Y8, Y12 and Y16. The next cycle of switching will stagger the connections of the amplifiers as is described in connection with preamplifiers A, B, C and D and so on until after four switching cycles the situation of FIG. 4 is once more reached. The same advantages of redunduancy are obtained and all information is not lost if one of the E amplifiers breaks down.

Figure 3:
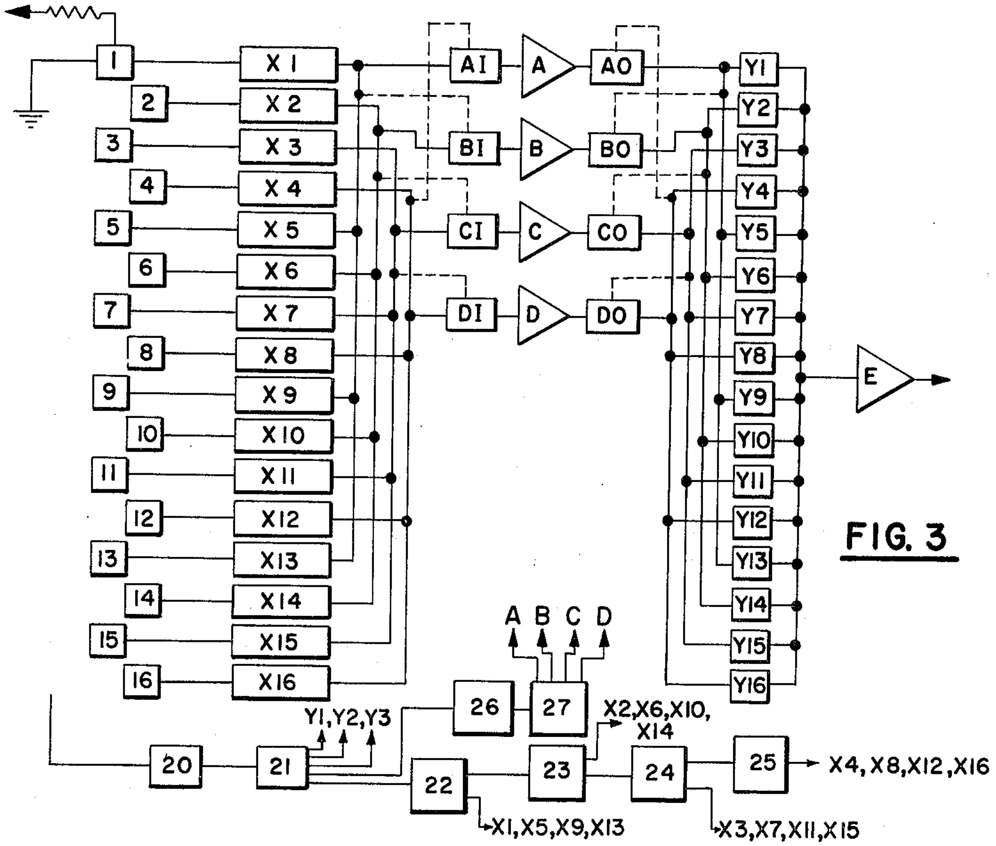
FIG. 3 is a diagrammatic illustration of electronic switching means.

The I, O and E bank switches in FIG. 3 and FIG. 4 have four circuits just as do the mechanical I and O switches in FIG. 2. In FIG. 3 and FIG. 4 only one output is shown in order to avoid confusion with a large number of connections.

We claim:

1. Switching circuits for minimizing loss of signal information with amplifier failure comprising, (a) $x$ sources of signal, a much smaller number $y$, $>1$, of preamplifiers and $z$ of operational amplifiers, (b) a first fast bank of switching means, each switching means connecting to a single signal source, the outputs of the switching means connected in $y$ groups, means to actuate the switching means to switch each signal source sequentially at frequency $f$, (c) a first slow bank of $y$ switching means each switching means being connected to a preamplifier, actuating means to switch the inputs of said first slow bank switching means sequentially to groups of connected outputs of said first fast bank of switching means, said actuating means effecting switching at a frequency $f/nx$ where $n$ is a positive integer, (d) a second fast bank of $x$ switching means, input connections to said second fast bank switching means connected together in $y$ groups in the same order as the output connection groups of the first fast bank switching means, means connecting the outputs of said second fast bank to said operational amplifiers, actuating means to switch said second fast bank switching means in synchronism with those of said first fast bank switching means, (e) a second slow bank of $y$ switching means for switching the outputs of said preamplifiers to the inputs of the second fast bank switching means, and means to actuate the said second slow bank switching means in synchronism with said first slow bank switching means.

2. Switching circuits according to claim 1 in which in addition to the elements of sections (a) to (e) there is provided, (f) a plurality of operational amplifiers and a third slow switching bank of switching means the output connections of which are connected respectively to the operational amplifiers, and (g) the output connections from the switching means of the second fast switching bank being connected in $z$ groups and actuating means for the said switching means of the third slow switching bank to switch to the groups of output connections of the second fast switching bank, said actuating means switching synchronously with the first and second slow banks.

3. Switching circuits according to claim 1 in which the switching means of all banks are mechanical switching means.

4. Switching circuits according to claim 1 in which the switching means of all of the banks are electronic switching means and in which the actuating means comprise means for generating electrical pulses of the frequency and duration for actuating the switching elements of each bank at their predetermined frequency.

5. Switching circuits according to claim 4 in which frequency dviding circuits receive electrical pulses at frequency $f$ and the division produces pulses of frequency $f/nx$, and pulse stretching circuits connected to the output of the frequency dividing circuits, said stretching circuits producing a pulse width stretch the reciprocal of the ratio between switching frequencies of the elements of the fast switching banks divided by the frequency of the slow switching banks and means for connecting the output of the pulse stretching circuits to the switching means of the slow switching banks.

References Cited by the Examiner

UNITED STATES PATENTS

| | | | |
|---|---|---|---|
| 2,892,082 | 6/1959 | Single | 328—104 |
| 3,089,091 | 5/1963 | Lindenthal | 328—104 |

ROY LAKE, *Primary Examiner.*

NATHAN KAUFMAN, *Examiner.*